(12) United States Patent
Givens

(10) Patent No.: US 8,677,905 B2
(45) Date of Patent: Mar. 25, 2014

(54) SINGLE-BRIDGE MANIPULATOR MANEUVERING SYSTEM

(76) Inventor: Ray Givens, London (CA)

(*) Notice: Subject to any disclaimer, the term of this patent is extended or adjusted under 35 U.S.C. 154(b) by 799 days.

(21) Appl. No.: 12/571,403

(22) Filed: Sep. 30, 2009

(65) Prior Publication Data

US 2011/0076125 A1    Mar. 31, 2011

(51) Int. Cl.
*B61B 12/02* (2006.01)
*B61B 13/04* (2006.01)
*B64F 5/00* (2006.01)

(52) U.S. Cl.
USPC .............................. 104/98; 105/146; 414/589

(58) Field of Classification Search
USPC ................. 104/89–94, 96, 98, 106–108, 111; 105/141, 146, 147, 148, 150, 154; 414/589; 901/16
See application file for complete search history.

(56) References Cited

U.S. PATENT DOCUMENTS

| | | | |
|---|---|---|---|
| 3,858,518 A | | 1/1975 | Nyman |
| 3,902,432 A | * | 9/1975 | Shortridge et al. ........... 105/150 |
| 4,423,685 A | * | 1/1984 | Kerckhoff ...................... 105/150 |
| 5,299,506 A | * | 4/1994 | Kakida et al. ................... 104/98 |
| 6,058,849 A | * | 5/2000 | Ostholt et al. ................... 104/93 |
| 6,264,017 B1 | * | 7/2001 | Evans .......................... 191/23 A |
| 6,738,691 B1 | * | 5/2004 | Colgate et al. ................ 700/245 |
| 2003/0126827 A1 | | 7/2003 | Davis et al. |
| 2004/0173438 A1 | | 9/2004 | Ursitti |
| 2005/0028704 A1 | * | 2/2005 | Traubenkraut et al. ........ 104/111 |
| 2006/0260502 A1 | * | 11/2006 | Hjort .............................. 104/93 |

* cited by examiner

*Primary Examiner* — R. J. McCarry, Jr.
(74) *Attorney, Agent, or Firm* — Katten Muchin Rosenman LLP

(57) ABSTRACT

In one aspect, the invention is directed to a load maneuvering system that includes a pair of runway rails, a bridge that is movable on the runway rails and that includes a single bridge rail, a carriage that is movable on the single bridge rail, and a manipulator supported by the carriage. The bridge rail is configured to support the assembly of the carriage and manipulator when a load is carried by the manipulator and a resultant moment is imposed on the bridge rail. The moment may be imposed in a direction about the bridge axis, in a direction about the runway axis, or a combination of the two. By providing a single bridge rail with an enclosed member as part of (or the entirety of) the bridge rail, the overall system is lighter and requires less power for movement of the bridge on the runway rails, and requires less power to move the carriage on the bridge. Additionally, the assembly is simplified relative to some load maneuvering systems of the prior art thereby making it less expensive to manufacture.

19 Claims, 10 Drawing Sheets

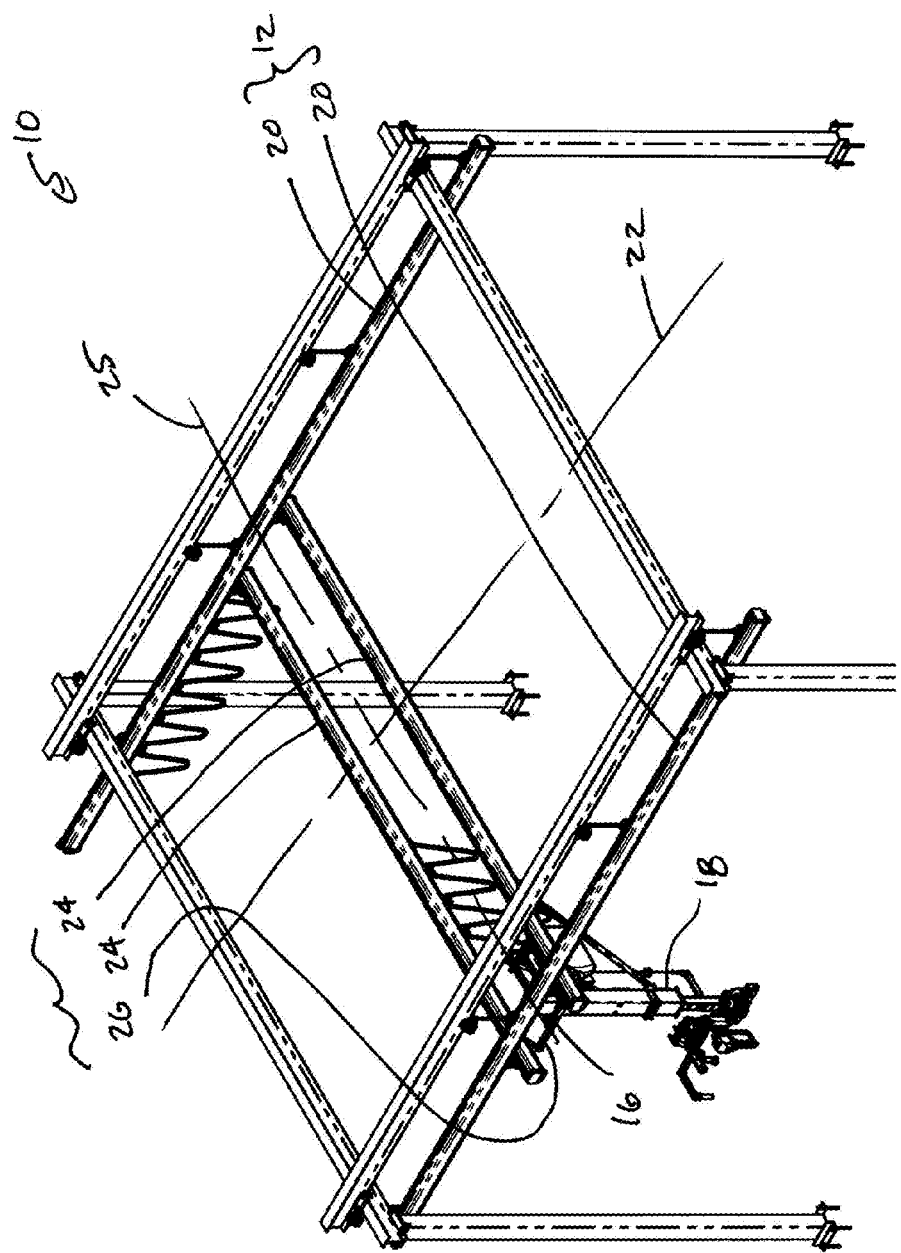

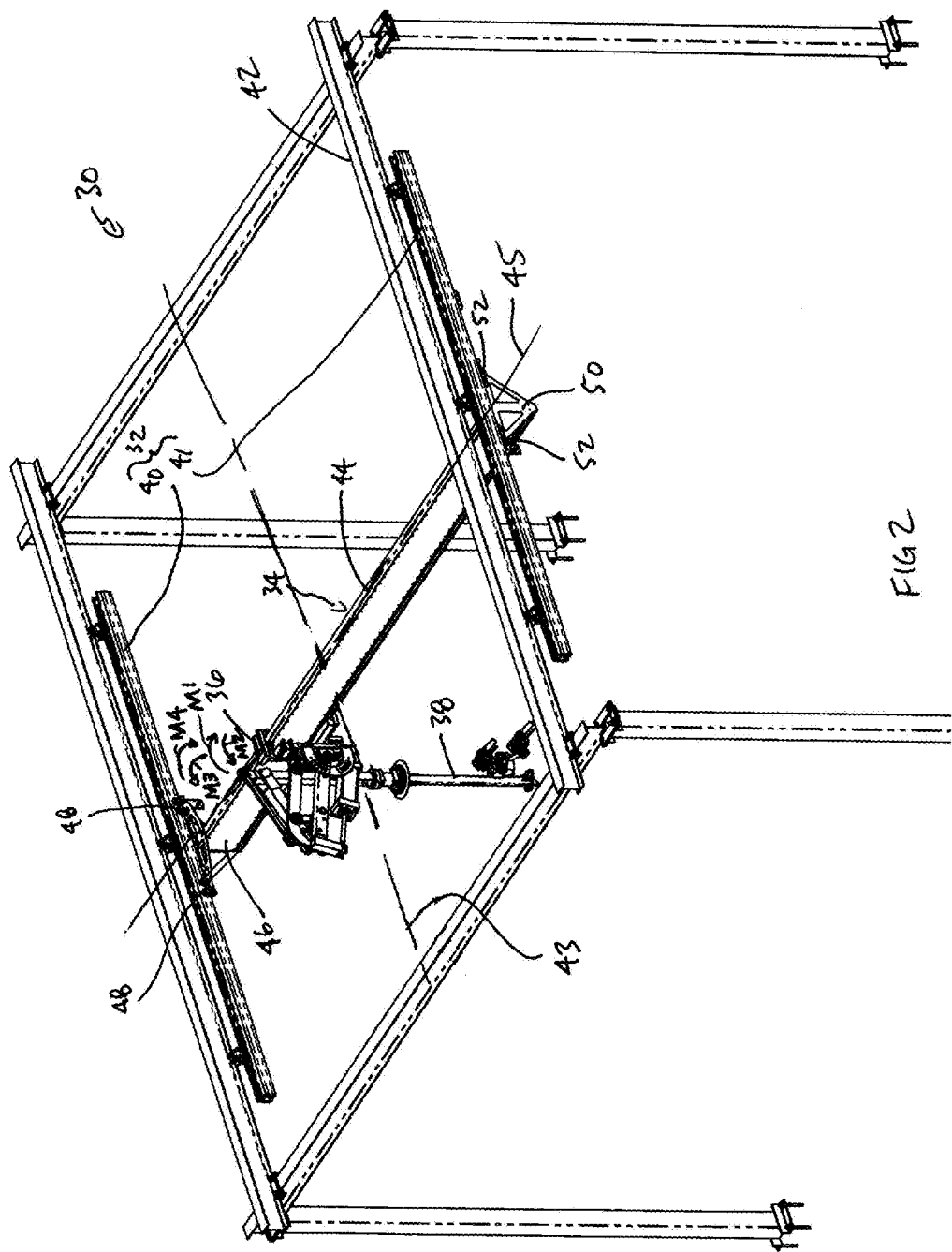

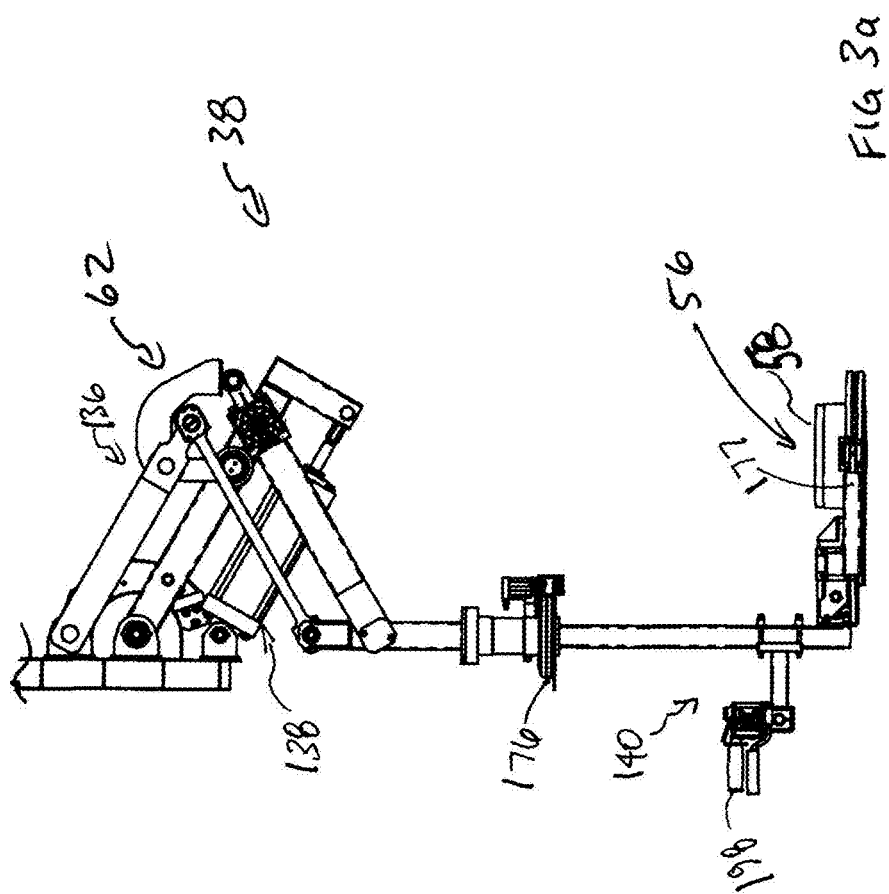

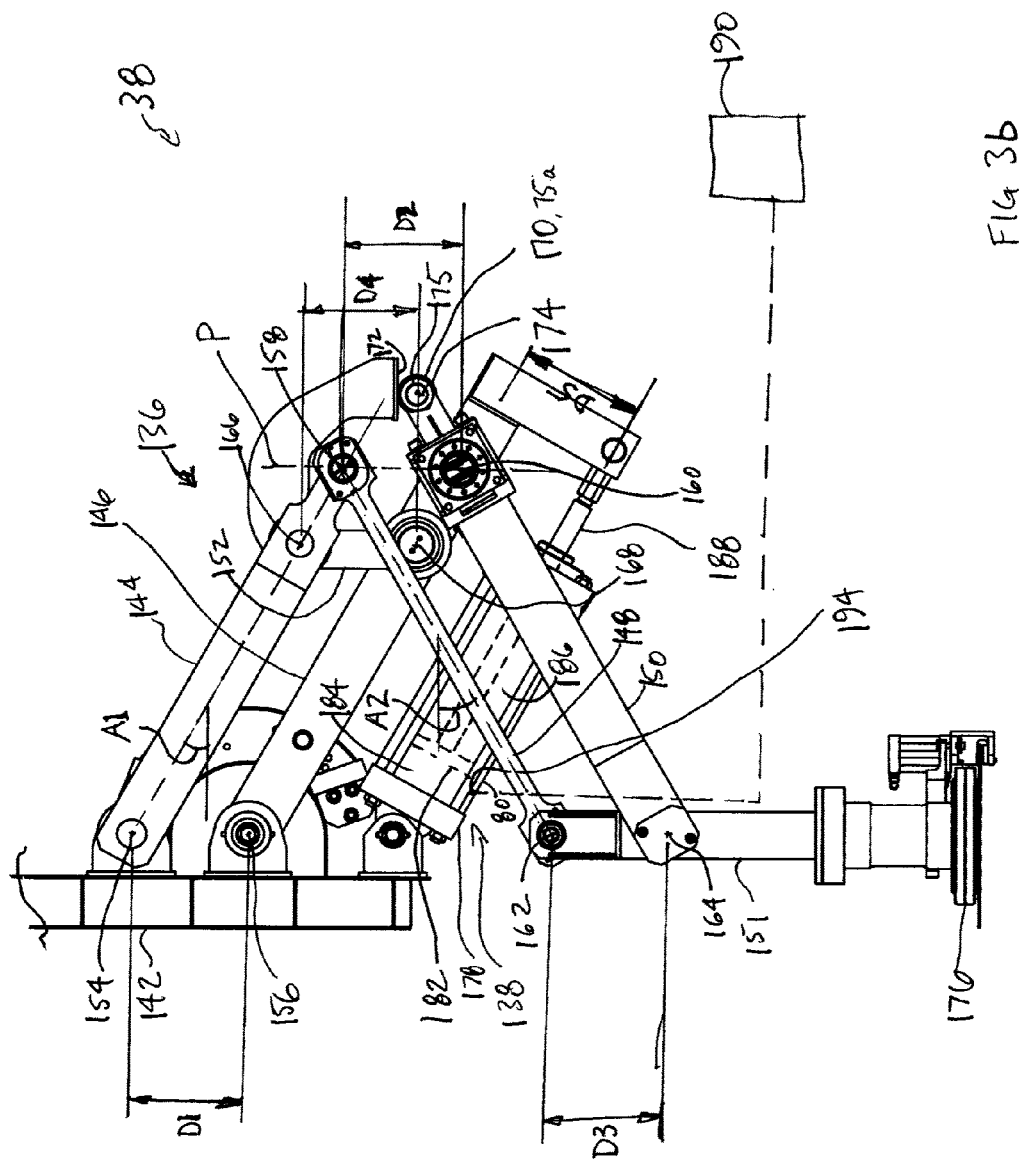

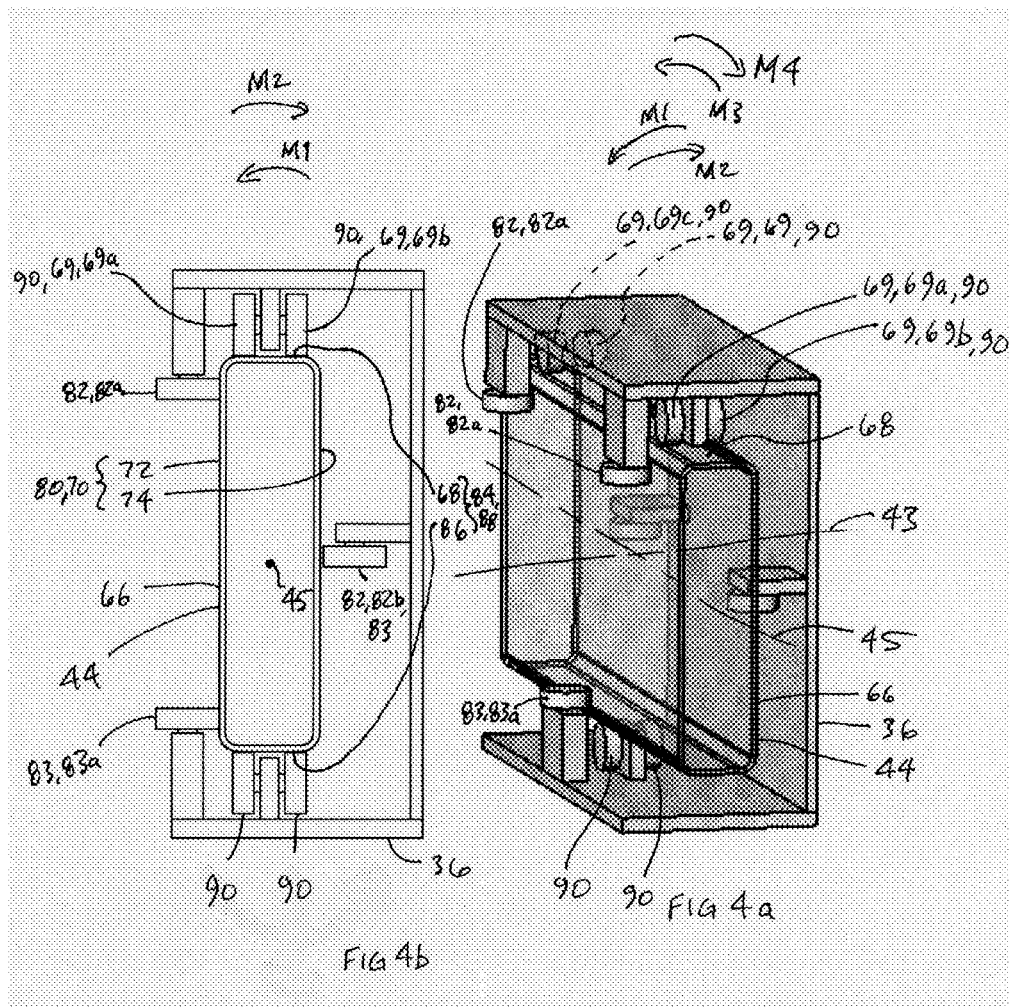

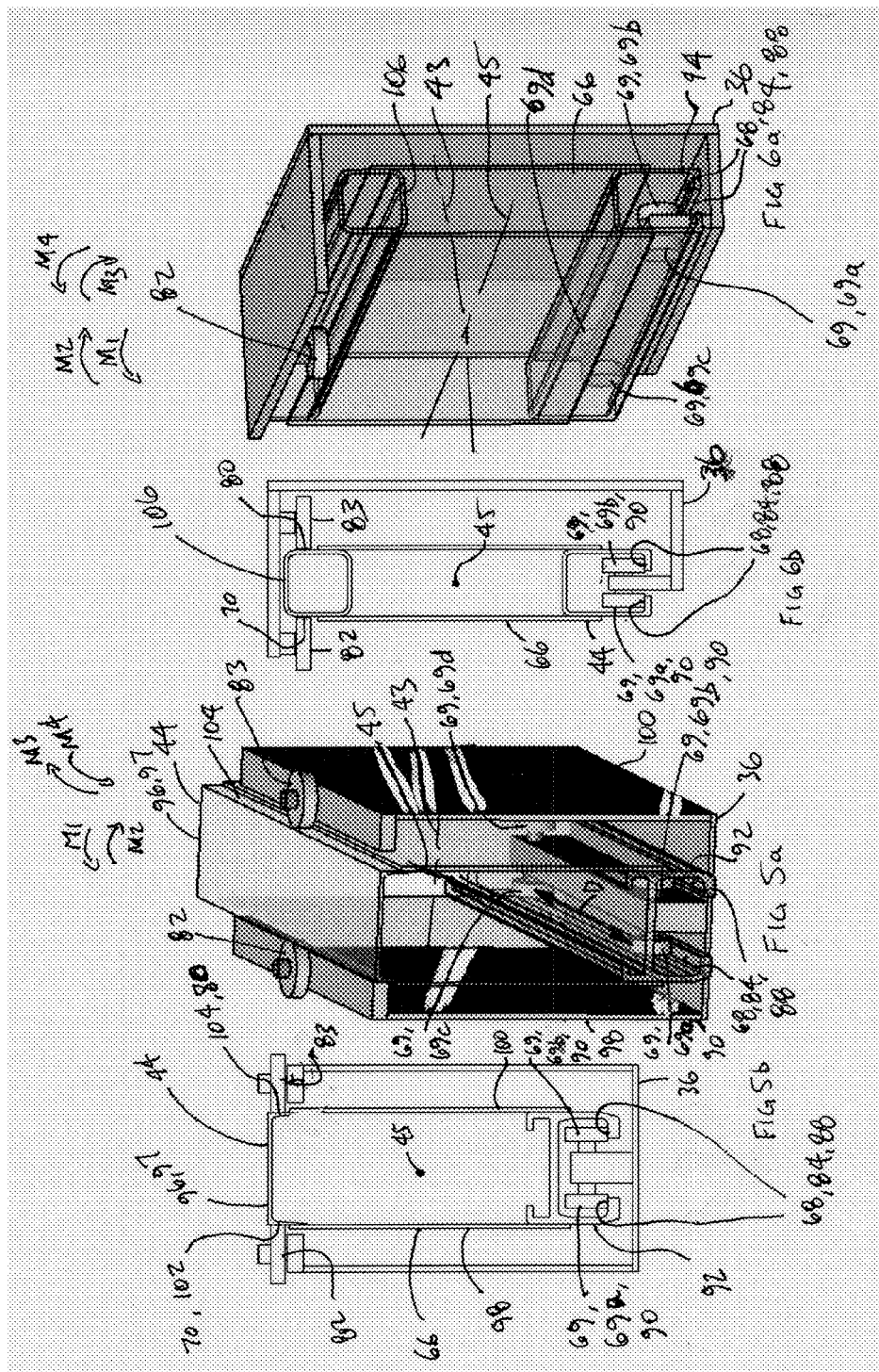

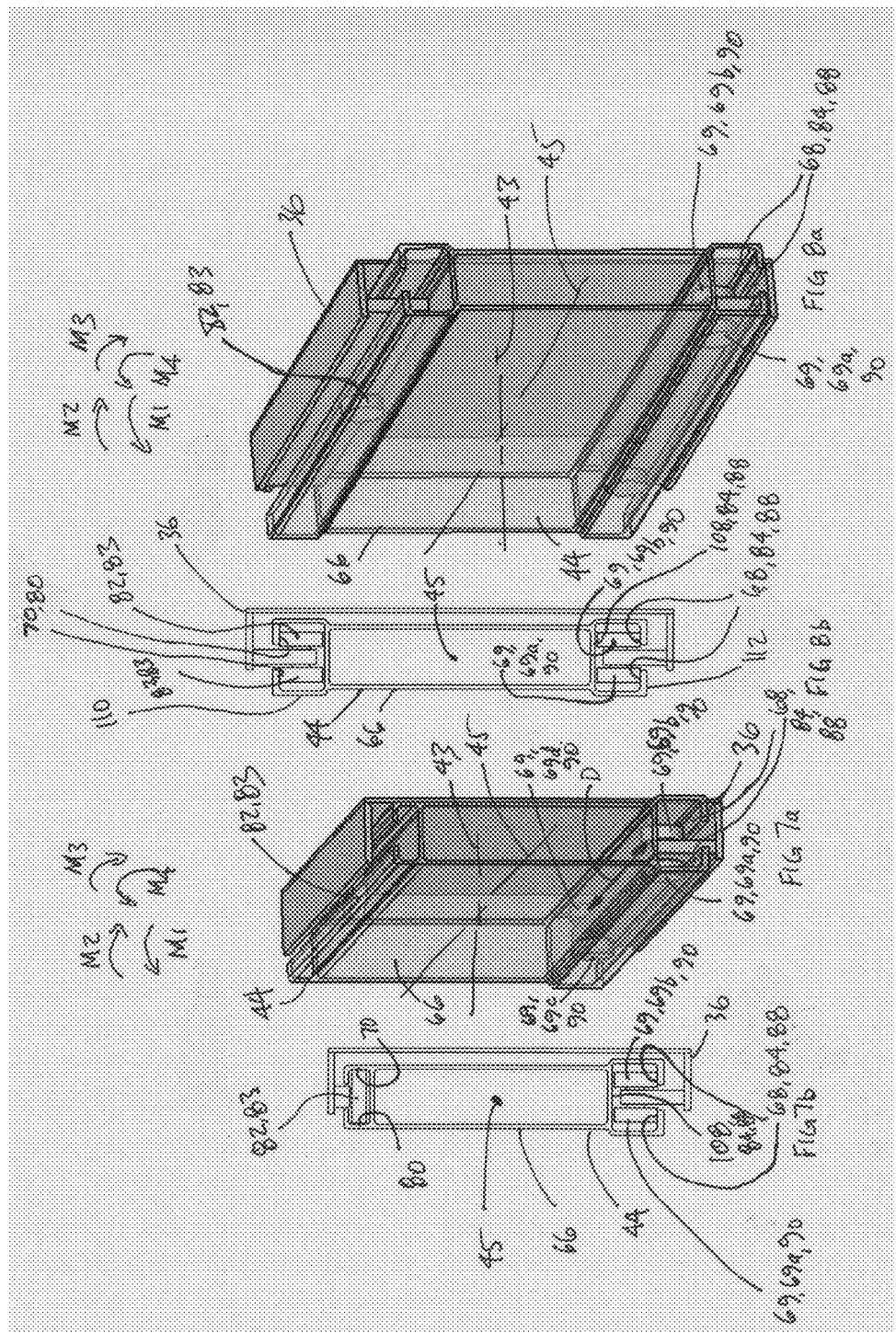

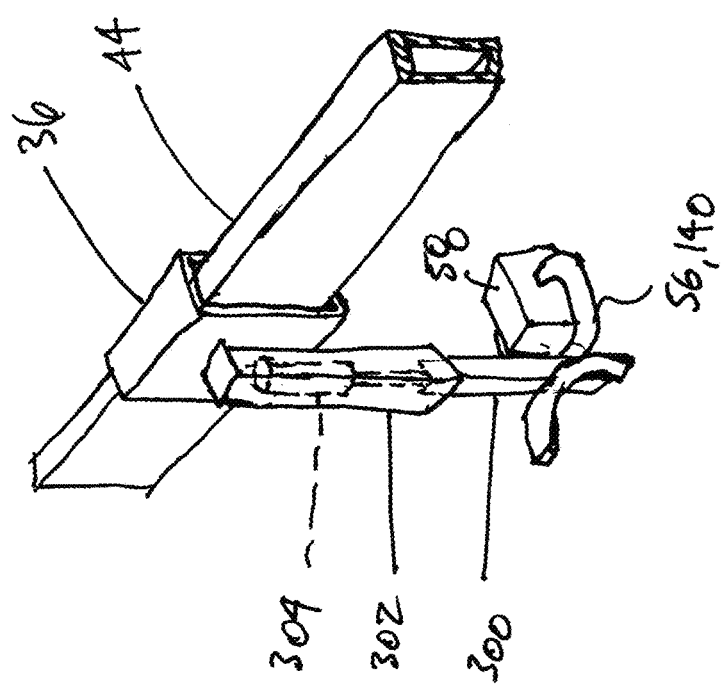

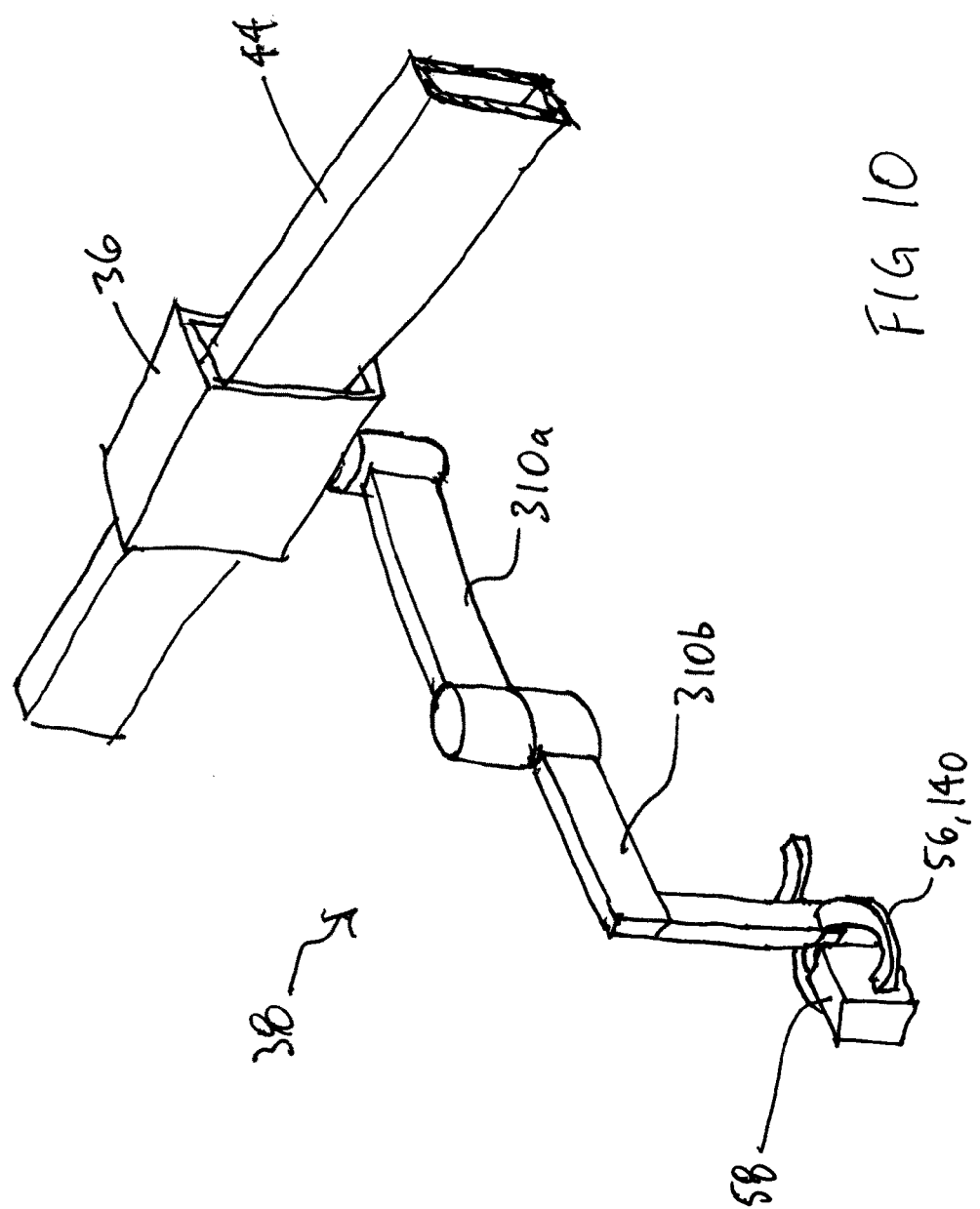

SINGLE-BRIDGE MANIPULATOR MANEUVERING SYSTEM

FIELD OF THE INVENTION

The present invention relates to load maneuvering systems, and more particularly to a load maneuvering system that incorporates a manipulator that is movable on a carriage of an overhead crane system.

BACKGROUND OF THE INVENTION

Some load maneuvering systems combine runways typically used on overhead cranes, with manipulators typically used in stationary applications. The combination is useful in that it provides the advantages associated with a manipulator such as the ability to hold a load off-center from the load's center of gravity, the ability to reach into spaces that are only accessible from the side, while adding the mobility associated with an overhead crane runway system. However, such systems can be relatively heavy, expensive to manufacture and can consume a significant amount of energy during operation.

It would be advantageous to provide a load maneuvering system that addresses at least partially one or more of the problems described above.

SUMMARY OF THE INVENTION

In one aspect, the invention is directed to a load maneuvering system that includes a pair of runway rails, a bridge that is movable on the runway rails and that includes a single bridge rail, a carriage that is movable on the single bridge rail, and a manipulator supported by the carriage. The bridge rail is configured to support the assembly of the carriage and manipulator when a load is carried by the manipulator and a resultant moment is imposed on the bridge rail. The moment may be imposed in a direction about the bridge axis, in a direction about the runway axis, or a combination of the two. By providing a single bridge rail with an enclosed member as part of (or the entirety of) the bridge rail, the overall system is lighter and requires less power for movement of the bridge on the runway rails, and requires less power to move the carriage on the bridge. Additionally, the assembly is simplified relative to some load maneuvering systems of the prior art thereby making it less expensive to manufacture.

In a particular embodiment of the first aspect, the load maneuvering system includes:

first and second runway rails that extend parallel to a generally horizontal runway axis;

a bridge including a single bridge rail that extends along a bridge axis that is generally horizontal and perpendicular to the runway axis and that is movable on the runway rails along the runway axis, wherein the bridge includes a plurality of first bridge wheels connected to the bridge rail and supported on the first runway rail, and a plurality of second bridge wheels connected to the bridge rail and supported on the second runway rail, a carriage having a plurality of carriage wheels thereon permitting movement of the carriage along the bridge rail; and a manipulator configured for holding a load, wherein the manipulator is supported by the carriage and is positionable to cause a first moment to be imposed through the carriage wheels on the bridge rail in a first direction about the bridge axis, wherein the manipulator is positionable to cause a second moment to be imposed through the carriage wheels on the bridge rail in a second direction about the bridge axis, wherein the manipulator is positionable to cause a third moment to be imposed through the carriage wheels on the bridge rail in a first direction about the runway axis, and wherein the manipulator is positionable to cause a fourth moment to be imposed through the carriage wheels on the bridge rail in a second direction about the runway axis, wherein the bridge rail includes an enclosed member that extends along the bridge axis, a load weight support surface supported by the enclosed member and oriented to support the weight of the load, a first moment support surface supported by the enclosed member and oriented to resist the first moment, a second moment support surface supported by the enclosed member and oriented to resist the second moment, a third moment support surface supported by the enclosed member and oriented to resist the third moment, and a fourth moment support surface supported by the enclosed member and oriented to resist the fourth moment, and wherein the first and second bridge wheels are positioned so as to resist rotation of the bridge rail from the first and second moments.

BRIEF DESCRIPTION OF THE DRAWINGS

The present invention will now be described by way of example only with reference to the attached drawings, in which:

FIG. 1 is a perspective view of a load maneuvering system for in accordance with the prior art;

FIG. 2 is a perspective view of a load maneuvering system for in accordance with an embodiment of the present invention;

FIGS. 3a-3c are elevation views of a manipulator that is part of the system shown in FIG. 2;

FIG. 4a is a transparent perspective view of a portion of a bridge and a portion of a carriage that may be included as part of the system shown in FIG. 2;

FIG. 4b is an elevation view of the elements shown in FIG. 4a;

FIG. 5a is a transparent perspective view of a portion of another bridge and a portion of another carriage that may be included as part of the system shown in FIG. 2;

FIG. 5b is an elevation view of the elements shown in FIG. 5a;

FIG. 6a is a transparent perspective view of a portion of yet another bridge and a portion of yet another carriage that may be included as part of the system shown in FIG. 2;

FIG. 6b is an elevation view of the elements shown in FIG. 6a;

FIG. 7a is a transparent perspective view of a portion of yet another bridge and a portion of yet another carriage that may be included as part of the system shown in FIG. 2;

FIG. 7b is an elevation view of the elements shown in FIG. 7a;

FIG. 8a is a transparent perspective view of a portion of yet another bridge and a portion of yet another carriage that may be included as part of the system shown in FIG. 2;

FIG. 8b is an elevation view of the elements shown in FIG. 8a;

FIG. 9 is an elevation view of an alternative manipulator that can be used as part of the system shown in FIG. 2; and FIG. 10 is an elevation view of another alternative manipulator that can be used as part of the system shown in FIG. 2.

DETAILED DESCRIPTION OF THE INVENTION

Figure 3C:
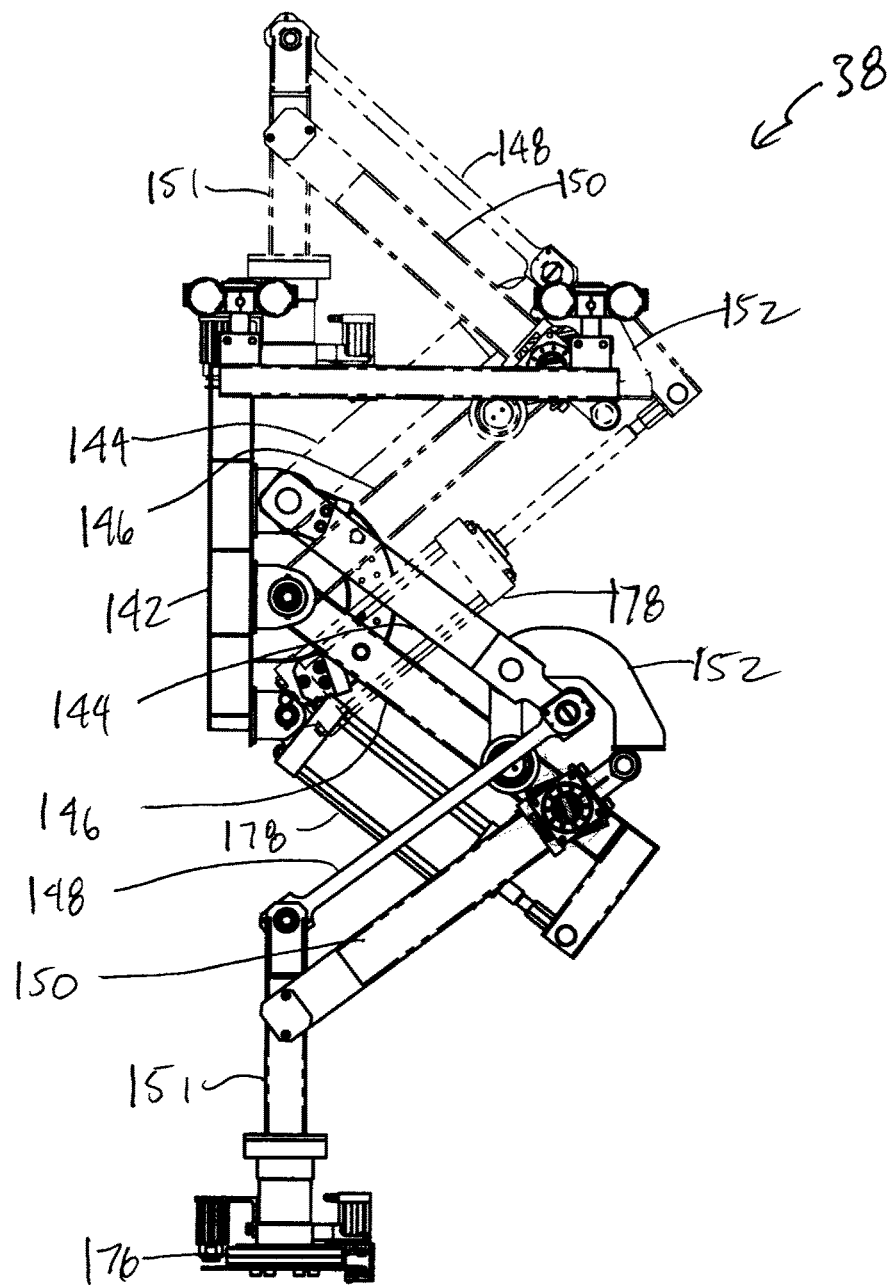

Reference is made to FIG. 1, which shows a load maneuvering system 10 of the prior art. The load maneuvering system 10 includes a runway 12, a bridge 14, a carriage 16 and a manipulator 18. The runway 12 is made up of a pair of runway rails 20 that extend parallel to a generally horizontal runway axis 22. The bridge 14 is made up of a pair of bridge rails 24 that extend parallel to a generally horizontal bridge axis 25 and a connecting structure 26 extending therebetween. The bridge axis 25 is perpendicular to the runway axis 22. Each bridge rail 24 is rollably supported on the runway rails 20 at each end by bridge wheels. A bridge drive motor (not shown) may be provided to drive the bridge 14 along the runway rails 20. The carriage 16 is rollably supported at each end on the bridge rails 24 by means of carriage wheels. A carriage drive motor (not shown) may be provided to drive the carriage along the bridge rails 24.

The manipulator 18 is configured to pick up loads in such a manner that it imposes a moment on the carriage 16. In turn, the carriage 16 imposes a moment on the bridge 14. The direction of the moment depends on various factors such as the position of the manipulator 18 and the where the manipulator 18 has picked up the load relative to the center of gravity of the load. The moment created by the manipulator 18 may have a component about the bridge axis 25 and a component about the runway axis 22. The spacing between the bridge rails 24 inherently provides resistance to the moment exerted on the bridge about the bridge axis 25. The spacing between the runway rails 20 inherently provides resistance to the moment exerted on the bridge about the runway axis 22.

The movement of the bridge 14 on the runway requires a significant amount of force due to the significant amount of weight in the two bridge rails 24 and the connecting structure 26. As noted above, a motor may be provided for exerting the necessary force.

Reference is made to FIG. 2, which shows a load maneuvering system 30 in accordance with an embodiment of the present invention. The load maneuvering system 30 includes a runway 32, a bridge 34, a carriage 36 and a manipulator 38. The runway 32 is made up of a first runway rail 40 and a second runway rail 41. The first and second runway rails 40 and 41 are supported in an elevated position in any suitable way, such as on a floor-mounted frame shown at 42. Alternatively the first and second runways rails 40 could be mounted to some other structure, such as to roof joists in a manufacturing facility. The first and second runway rails 40 and 41 extend parallel to a generally horizontal runway axis 43. The runway rails 40 and 41 may be made substantially from Aluminum.

The bridge 34 is made up of a single bridge rail 44 that extends along a generally horizontal bridge axis 45. The bridge axis 45 is perpendicular to the runway axis 43. The bridge rail 44 is rollably supported at a first end 46 on the first runway rail 40 by a plurality of first bridge wheels 48. Similarly, the bridge rail 44 is rollably supported at a second end 50 on the first runway rail 40 by a plurality of second bridge wheels 52.

A bridge drive motor (not shown) may optionally be provided to drive the bridge 34 along the runway rails 40 and 41. Other materials may also be used in addition to or instead of Aluminum. Optionally the carriage 34 may be painted or otherwise coated.

The bridge 34 may substantially be made from Aluminum. Other materials may also be used in addition to or instead of Aluminum. Optionally the bridge 34 may be painted or otherwise coated.

The carriage 36 is rollably supported at each end on the bridge rail 44 by means of carriage wheels, which are described in further detail below. A carriage drive motor (not shown) may optionally be provided to drive the carriage along the bridge rail 44.

The carriage 36 may substantially be made from Aluminum. Other materials may also be used in addition to or instead of Aluminum. Optionally the carriage 34 may be painted or otherwise coated.

The manipulator 38 is configured to pick up loads in such a manner that it imposes a moment on the carriage 36. In turn, the carriage 36 imposes a moment on the bridge 34. The manipulator 38 is mounted to the carriage 36 in any suitable way, such as by a bolted connection. The manipulator 38 may have any particular structure such that it can impose a moment on the carriage 36 when holding a load. For example, the manipulator may be similar to any manipulator embodiment described in the applicant's co-pending U.S. patent application, Ser. No. 12/121,225, entitled "Compound-Arm Manipulator" which was filed on May 15, 2008. An exemplary embodiment of the manipulator 38, which is described in the aforementioned co-pending patent application is shown in FIGS. 3a, 3b and 3c. In FIGS. 3a and 3b, the manipulator 38 is shown in a lowered position. In FIG. 3c, the manipulator 38 is shown in both a lowered position (in solid lines) and in a raised position (in broken lines). Referring to FIG. 3a, the manipulator 38 may include an arm assembly 62 and a load holding member 56 connected thereto, which is configured to hold a load 58. The arm assembly 62 may include a linkage 136. The manipulator 38 further includes a load balancing system 138. The load holding member 56 may optionally be an end effector 140, which is capable of holding the load 58 in a cantilevered manner (ie. which is capable of gripping the load 58 in a orientation whereby the center of gravity of the load 58 is not at its point of lowest potential energy and therefore the load 58 imposes a moment on the end effector 140).

Referring to FIG. 3b, the linkage 136 includes a base 142, a first link 144, a second link 146, a third link 148, a fourth link 150, a lift arm 151 and a control arm 152. The first and second links 144 and 146 are rotatably connected to the base 142 about first and second connection axes 154 and 156 respectively. The first and second connection axes 154 and 156 may be substantially vertically spaced apart, and have a first connection spacing D1.

The third and fourth links 148 and 150 may be rotatably connected to the first and second links 144 and 146 about third and fourth connection axes 158 and 160. The third and fourth connection axes 158 and 160 may be substantially vertically spaced apart, and have a second connection spacing D2, which may be the same as D1. The third and fourth links 148 and 150 are rotatably connected to the lift arm 151 about fifth and sixth connection axes 162 and 164 respectively. The fifth and sixth connection axes 162 and 164 may be substantially vertically spaced apart, and have a third connection spacing D3, which may be the same as D1.

By having the first and second connection spacings D1 and D2 be vertical and be the same, the third and fourth connection axes 158 and 160 remain directly vertically spaced from each other throughout the range of motion of the linkage 136. By having the first, second and third connection spacings D1, D2 and D3 be vertical and be the same, the fifth and sixth connection axes 162 and 164 remain directly vertically spaced from each other throughout the range of motion of the linkage 136.

In any given position of the linkage 136, the first and second links 144 and 146 (in embodiments wherein they are parallel) have a first angle A1 relative to the horizontal. It will be understood that the angle A1 may be zero (ie. when the first and second links 144 and 146 themselves extend horizontally. Also at any given position of the linkage, the third and fourth links 148 and 150 extend at an angle A2 from the horizontal. The third and fourth links 148 and 150 may be maintained in an orientation relative to the first and second links 144 and 146 whereby the angle A2 is always the negative of the angle A1. In other words, if the first and second links 144 and 146 are at a selected number of degrees above the horizontal, then the third and fourth links 148 and 150 may be oriented at the same number of degrees below the horizontal, as shown when the linkage 136 is in the position shown in FIG. 3b.

By having the first, second and third connection spacings D1, D2 and D3 be vertical and be the same size, by having the angles A1 and A2 be negatives of each other, and by having the arm lengths from axis 154 to axis 158 and from axis 158 to axis 162 be equal to each other (and the arm lengths from axis 156 to axis 160 and from axis 160 to axis 164 be equal to each other), the range of motion of the end effector 140 itself as a result of flexure of the linkage 136 is strictly vertical. This facilitates the lowering of a load 58 into a selected position by an operator using the load maneuvering system 30, because there is no horizontal offset that is incurred by the load 140 during its lowering into the selected position.

It will be noted that the third and fourth connection axes 158 and 160 are horizontally displaced from the first and second connection axes 154 and 156 in a first direction away from the first and second connection axes 154 and 156, and that the fifth and sixth connection axes 162 and 164 are horizontally displaced from the third and fourth connection axes 158 and 160 in a second direction, which is generally towards the first and second connection axes 154 and 156. As a result, the linkage 136 is more compact than other linkages that incorporate only two links.

Optionally, the fifth and sixth connection axes 162 and 164 are substantially vertically spaced from the first and second connection axes 154 and 156. As a result, the overall footprint of the linkage 136 is minimized for a given amount of vertical range of motion of the linkage 136.

The control arm 152 spaces the third and fourth connection axes 158 and 160 by a selected amount, which is the second connection spacing D2. The control arm 152 may achieve this by being rotatably connected to the first and second links 144 and 146. The rotatable connections of the control arm 152 with the first and second links 144 and 146 takes place about seventh and eighth connection axes 166 and 168 respectively. The seventh and eighth connection axes 166 and 168 may be substantially vertically spaced apart, and are spaced apart by a fourth connection spacing D4 that is the same as the second connection spacing D2.

A mechanism is provided to hold the third and fourth links 148 and 150 in their selected orientation relative to the first and second links 144 and 146. The mechanism may have any suitable structure. For example, the mechanism may include a first bearing surface 170 that is positioned on the fourth link 150. The first bearing surface 170 engages a second bearing surface 172 on the control arm 152. As the linkage 136 flexes, the control arm 152 remains in a consistent orientation (eg. vertical), and as a result, the second bearing surface 172 remains in a constant orientation (eg. horizontal).

The first bearing surface 170 may be arcuate and may have a first bearing surface axis 174 associated therewith, and the second bearing surface 172 may be planar. The first bearing surface 170 may be positioned on the fourth link 150 so that there is symmetry between the first bearing surface axis 174, and the eighth connection axis 168 (relating to the connection between the control arm 152 and the second link 146) about a vertical plane P containing the fourth connection axis 160 (relating to the connection between the second link 146 and the fourth link 150. This symmetry remains present throughout the range of motion of the linkage 136, and so the first bearing surface 170 engages the second bearing surface 172 throughout the range of motion of the linkage 136.

The first bearing surface 170 may be the peripheral surface 175a of a roller 175, as shown in FIG. 3b. Alternatively, the first bearing surface 170 may be a non-rotating surface and the first and second bearing surfaces 170 and 172 may be configured so that there is low sliding friction therebetween. For example, the roller 175 could be replaced by a linear bearing that is non-rotating and that mates with a second bearing surface 172 that is suitably configured.

The engagement between the first bearing surface 170 and the second bearing surface 172 stops the third and fourth links 148 and 150 from rotating downwards about the connection axes 158 and 160 from the weight of the load 58 and thus holds the third and fourth links 148 and 150 in a selected orientation relative to the first and second links 144 and 146.

The linkage 136 may be configured so that the first and second bearing surfaces 170 and 172 are positioned on other links instead of the fourth link 150 and the control arm 152. For example, a first bearing surface could be provided on the third link 148 and a second bearing surface could be provided on the control arm 152 that engages the first bearing surface such that there is symmetry with the seventh connection axis 166 about a vertical plane passing through the third connection axis 158.

Referring to FIG. 3a, the end effector 140 may be any suitable type of end effector, and may be configured to hold a load 58 by any suitable means, such as by closure of jaws 177 around the load 158. The end effector 140 may be connected to the lift arm 151 by any suitable means, such as by a rotatable connector 176 that permits rotation of the end effector 140 about a vertical axis.

The load balancing device 138 is configured to support the linkage 136 in any selected position against the weight of the load 158, and is configured to permit the load 58 to be moved upwards or downwards by a selected amount of force on the lift arm 151. Referring to FIG. 3b, the load balancing device 138 may be any suitable type of load balancing device. For example, the load balancing device 138 may comprise a cylinder 178. The cylinder 178 may be connected between the base 142 and the second link 146 in such a way as to control the angular position of the second link 146. The cylinder 178 includes a housing 180, a piston 182 that divides the housing into a first chamber 184 and a second chamber 186, and a rod 188 connected to the piston 182. The housing 180 may be connected to the base 142 and the rod 88 may be connected to the second link 146.

The first chamber 184 of the cylinder 178 may be pressurized, while the second chamber 186 may be open to atmosphere and is therefore at atmospheric pressure.

A lift controller 190 is provided to control the cylinder 178 so that a selected degree of force is required for an operator to move the lift arm 151 up or down. When the operator moves the end effector 140, a pressure sensor 194 senses a pressure change that takes place in the first cylinder chamber 184 as a result of the movement of the end effector 140. The pressure sensor 194 sends signals indicative of the change in pressure to the lift controller 190. In response, the lift controller 190 adjusts the pressure in the first cylinder chamber 184 to permit the movement of the cylinder piston 182 in the desired direction with a selected amount of force on the end effector 140.

The manipulator 38 may substantially be made from Aluminum. Other materials may be provided along with or instead of Aluminum. Optionally the manipulator 38 may be painted or otherwise coated.

In an alternative configuration shown in FIG. 9, the manipulator 38 could be made up of a vertical arm 300 that telescopes in and out from a vertical tube 302 via a hydraulic cylinder 304. The arm has a load holding member 56, such as an end effector 140, at its lower end. Retracting the cylinder 304 lifts the arm 300, which in turn lifts a load 58 held by the load holding member 56. When the load 58 is lifted, the manipulator 38 in this embodiment could impose a moment on the bridge rail 44 via the carriage 36.

In yet another alternative configuration shown in FIG. 10, the manipulator 38 could be made up of a plurality of arms 310 connected end to end by rotary joints, thereby providing an arm system that articulates. In the embodiment shown there are two arms 310a and 310b. The most distal arm, shown at 310b in FIG. 10, has a load holding member 56, such as, for example, an end effector 140, at its distal end for holding a load 58. When holding the load 58, the manipulator 38 in FIG. 10 imposes a moment on the bridge rail 44 via the carriage 36.

Referring to FIG. 2, the combination of the carriage 36, the manipulator 38 and the load 58 may be positionable in such a way as to apply a moment to the bridge rail 44. The direction and magnitude of the moment imposed on the bridge rail 44 depends on many factors including the position of the load holding member 56, the position at which the manipulator 38 connects to the carriage 36, the locations at which the carriage 36 is supported on the bridge rail 44, the position of the center of gravity (shown at 60) of the load 58, the weight of the manipulator 38 itself, and other factors also.

In a first position, the manipulator 38 imposes a first moment shown at M1 in a first direction about the bridge axis 45. In a second position the manipulator 38 imposes a second moment shown at M2 in a second direction about the bridge axis 45. The second direction about the bridge axis 45 is, of course, opposed to the first direction about the bridge axis 45. In a third position, the manipulator 38 imposes a third moment shown at M3 in a first direction about the runway axis 43. In a fourth position the manipulator 38 imposes a fourth moment shown at M4 in a second direction about the runway axis 43. The second direction about the runway axis 43 is, of course, opposed to the first direction about the runway axis 43. It will be apparent that in most positions, the manipulator 38 will impose both a moment about the bridge axis 45 and a moment about the runway axis 43.

To resist the moment, the bridge rail 44 may have any suitable make up. For example, in the embodiment shown in FIGS. 4a and 4b, the bridge rail 44 is made up of an enclosed member 66. A load weight support surface 68 is supported by the enclosed member 66 and is oriented to support the weight of the load 58 (FIG. 2). The load weight support surface 68 may be the upper surface of the enclosed member 66, as shown in FIGS. 4a and 4b. The carriage 36 has a plurality of load weight support wheels shown at 69 and shown individually at 69a, 69b, 69c and 69d, which engage the load weight support surface 68 to rollably support the carriage 36 thereon. The wheels 69 are vertically oriented in the embodiment shown in FIGS. 4a and 4b.

A first moment support surface 70 is supported by the enclosed member 66 and is oriented to resist a first moment M1 (ie. any moment that is imposed in the first direction about the bridge axis 45). In the embodiment shown in FIGS. 4a and 4b, the first moment support surface 70 is made up of a first side surface 72 of the bridge rail 44 and a second side surface 74 of the bridge rail 44.

A second moment support surface 80 is supported by the enclosed member 66 and is oriented to resist the second moment M2 (ie. any moment that is imposed in the second direction about the bridge axis 45). In the embodiment shown in FIGS. 4a and 4b, the second moment support surface 80 is made up of the same surfaces 72 and 74 as the first moment support surface 70.

The carriage 36 has a plurality of first moment support wheels shown at 82, including first side surface engaging wheels 82a which engage the first side surface 72, and second side surface engaging wheels 82b, which engage the second side surface 74. The wheels 82 are positioned on the surfaces 72 and 74 in such a way as to resist a first moment M1.

The carriage 36 has a plurality of second moment support wheels 83, including first side surface engaging wheels 83a which engage the first side surface 72, and the second side surface engaging wheels 82b, which engage the second side surface 74. The wheels 83 are positioned on the surfaces 72 and 74 in such a way as to resist a second moment M2.

A third moment support surface 84 is supported by the enclosed member 66 and is oriented to resist a third moment M3 (ie. any moment that is imposed in the first direction about the runway axis 43). In the embodiment shown in FIGS. 4a and 4b, the third moment support surface 84 is made up of the upper surface 68 and a lower surface 86 of the enclosed member 66.

A fourth moment support surface 88 is supported by the enclosed member 66 and is oriented to resist the fourth moment M4 (ie. any moment that is imposed in the second direction about the runway axis 43). In the embodiment shown in FIGS. 4a and 4b, the fourth moment support surface 88 is made up of the same surfaces 68 and 86 as the third moment support surface 84.

The carriage 36 has a plurality of third moment support wheels shown at 90, which engage the third moment support surface 84 to rollably support the carriage 36 thereon. The wheels 90 are vertically oriented and are positioned towards first and second axial ends respectively on the carriage 36 for engaging the upper surface 68 and are positioned generally centrally on the carriage 36 for engaging the lower surface 86 in the embodiment shown in FIGS. 4a and 4b. The wheels 90 additionally make up fourth moment support wheels of the carriage 36 in the embodiment shown in FIGS. 4a and 4b.

In the embodiment shown in FIG. 4, the load weight support wheels 69 make up the portion of the third and fourth moment support wheels 90 which engage the upper surface 68.

When a moment is imposed on the bridge, the carriage 36 (and the attached manipulator 38 and the load 58) will be urged to pivot about the surface on the bridge 34 that supports the carriage 36, the manipulator 38 and the load 58 (ie. the load weight support surface 68). That surface thus acts as a fulcrum about which the carriage 36, manipulator 38 and load 58 are urged to rotate.

In the embodiment shown in FIGS. 4a and 4b it will be noted that the upper and lower surfaces 68 and 86 act to some extent to resist the first and second moments M1 and M2, however, their relatively short width and the orientation of the bridge wheels 90 thereon combine in such a way that their contribution to the overall resistance to the first and second moments M1 and M2 is relatively small in comparison to the resistance provided by the engagement of the bridge wheels 82 on the first and second moment support surfaces 70 and 80. Similarly, in the embodiment shown in FIGS. 4a and 4b it will be noted that the first and second side surfaces 72 and 74 act to some extent to resist the third and fourth moments M3 and M4, however, their orientation and the orientation of the bridge wheels 82 thereon combine in such a way that their contribution to the overall resistance to the third and fourth moments M3 and M4 is relatively small compared to the resistance provided by the engagement of the bridge wheels 90 on the third and fourth moment support surfaces 84 and 88.

Reference is made to FIGS. 5a and 5b which show another type of construction for the bridge rail 44 and for the carriage 36. In the embodiment shown in FIGS. 5a and 5b, the bridge rail 44 includes a load weight support member 92 on which is positioned the load weight support surface 68. In the embodiment shown in FIGS. 5a and 5b, the load weight support surface 68 is an interior surface thereby hiding the load weight support wheels 69 from view by persons in the vicinity of the load maneuvering system 10. In the embodiment shown in FIGS. 5a and 5b the load weight support member 92 constitutes a lower horizontal support member that in part defines the enclosed member 66. The rest of the enclosed member 66 is defined by an upper horizontal support member 96, which is opposed to the load weight support member 92, and first and second vertical support members 98 and 100. In the embodiment shown in FIGS. 5a and 5b, the upper horizontal support member 96 is a channel beam 97, and the first and second vertical support members 98 and 100 are made a suitable gage of sheet metal or optionally from metal plate. The load weight support member 92, the upper horizontal support member 96, and the first and second vertical support members 98 and 100 may be connected to each together by any suitable means, such as by rivets, bolts, welds or any combination thereof.

In the embodiment shown in FIGS. 5a and 5b, the first moment support surface 70 is on a first side surface of the bridge rail 44, which in this embodiment is an exterior surface 102 on one of the flanges of the channel beam 97. The second moment support surface 80 is on a second opposing side surface of the bridge rail 44 which in this instance is an exterior surface 104 on the other flange of the channel beam 97. The carriage 36 has one first moment support wheel 82, which is horizontally oriented and which engages the surface 102. The carriage 36 has one second moment support wheel 82, which is horizontally oriented and which engages the surface 104 and which is directly opposed to the first moment support wheel 82.

In the embodiment shown in FIGS. 5a and 5b, both the third and fourth moment support surfaces 84 and 88 may be the load weight support surface 68, depending on the axial spacing shown at D between the load weight support wheels 69a and 69b towards one end of the carriage 34 and the load weight support wheels 69c and 69d towards the other end of the carriage 34. Thus the third and fourth moment support wheels 90 are the load weight support wheels 69.

Reference is made to FIGS. 6a and 6b, which show yet another type of construction for the bridge rail 44 and for the carriage 36. In the embodiment shown in FIGS. 6a and 6b, the bridge rail 44 is similar to the bridge rail 44 in FIGS. 5a and 5b, with the principal difference being that the upper horizontal support member 96 is itself an enclosed member (in this instance a beam of hollow square tubing) shown at 106. The lower horizontal support member 92 shown in FIGS. 6a and 6b may also differ from the lower horizontal support member 92 shown in FIGS. 5a and 5b in that it may be made from sheet or plate metal that is formed, instead of being made from an extruded member.

Reference is made to FIGS. 7a and 7b, which show yet another type of construction for the bridge rail 44 and for the carriage 36. In the embodiment shown in FIGS. 7a and 7b, the bridge rail 44 is similar to the bridge rail 44 in FIGS. 5a and 5b, with some differences. One difference is that the load weight support surface 68 and the moment support surfaces 70, 80, 84 and 88 are positioned such that relatively few wheels are needed on the carriage 36 to engage these surfaces 68, 70, 80, 84 and 88. This reduces the rolling resistance of the carriage 36, which reduces the power required to move it along the bridge 34. In the embodiment shown in FIGS. 7a and 7b, the load weight support surface 68 is provided on an interior surface, similar to the embodiment shown in FIGS. 5a and 5b. The carriage 36 includes two pairs of load weight support wheels 69 (wheels 69a and 69b towards one end and wheels 69c and 69d towards the other end).

The third and fourth moment support surfaces 84 and 88 are made up of the load weight support surface 68 and an opposing surface 108 that is positioned just above the tops of the load weight support wheels 69. Thus, the load weight support wheels 69 also act as the third and fourth moment support wheels 90. By providing the surface 108 just above the wheels 69, 90, the spacing D between the two pairs of wheels 69a and 69b and 69c and 69d may be reduced relative to the embodiment shown in FIGS. 5a and 5b. The reduced spacing permits the overall length of the carriage 36 to be relatively small, thereby reducing the weight of the carriage 36 and correspondingly the amount of power required to move it along the bridge 34.

The first and second moment support surfaces 70 and 80 may also be interior surfaces and may be positioned such that there is a small amount of clearance from the edge of the single, horizontally oriented wheel that is the first and second moment support wheel 82, 83. Thus, a total of 5 wheels are provided on the carriage 36 for handling the weight of the load 58 (FIG. 2), and for handling first, second, third and fourth moments M1, M2, M3 and M4. It will be noted that by providing all of the surfaces that are engaged by wheels as interior surfaces, paint wear on the bridge rail 44 that can occur after repeated rolling of the carriage 36 thereon is hidden from view of any people in the vicinity of the load maneuvering system 10.

Reference is made to FIGS. 8a and 8b, which show yet another type of construction for the bridge rail 44 and for the carriage 36. In the embodiment shown in FIGS. 8a and 8b, the bridge rail 44 and carriage 36 are similar to the bridge rail 44 and carriage 36 in FIGS. 7a and 7b, with a difference being that, instead of one horizontally oriented wheel 82, 83 (as shown in FIGS. 7a and 7b), the carriage 36 in FIGS. 8a and 8b includes a pair of vertically oriented wheels 82, 83 which are captured by interior surfaces 70 and 80 in an upper form 110 that is a mirror image of the lower form 112 in which the load weight support surface 68 is positioned. In the embodiment shown in FIGS. 8a and 8b it is possible for the surfaces 84 and 88 in the upper form 110 to contribute to support the carriage 36 against third and fourth moments M3 and M4.

In each of the embodiments described and shown herein, the bridge 34 is made using a single bridge rail that includes an enclosed member 66 which supports the first, second, third and fourth moment support surfaces and which supports a load weight support surface. In some experiments it was found surprisingly that the bridge 34 made using an enclosed member in accordance with an embodiment of the present invention has a resistance to moments that was in some cases 100 times more than a single bridge rail of similar weight but without an enclosed member. By making the bridge 34 in accordance with an embodiment of the invention, the bridge 34 has suitable strength (ie. resistance to deflection from the weight of the load 58 and resistance to torsional or other deformation from moments M1, M2, M3 and/or M4 arising from the load 58) while being lighter than a similar bridge that is made up of two bridge rails as shown in FIG. 1. By providing a bridge 34 that has a single bridge rail 44 the carriage 36 can be made relatively smaller as a result thereby saving further weight. This permits the bridge and the carriage to be moved using less power (either manual power or electrical power depending on whether or not the movement is achieved manually or by means of an electric motor).

Additionally, by reducing the number of wheels used to support the carriage 36 on the bridge rail 44, the resistance to rolling of the carriage 36 is further reduced, which further reduces the power requirement to move the carriage 36. Furthermore, it may in some embodiments become feasible to move the carriage 36 and/or bridge 34 manually where an electric motor would be required without the weight savings and the optional rolling resistance savings provided by embodiments of the present invention. The reduced complexity of the construction of the bridge 34 and carriage 36 due to the single bridge rail 44 reduces the cost of manufacture of the load maneuvering system 30 relative to some other load maneuvering systems of the prior art.

The first and second bridge wheels 48 and 52 may be positioned at a suitable positions relative to each other, to prevent the bridge from rotating as it resists a moment imposed thereon by the load 58, the carriage 36 and the manipulator 38.

In the embodiments shown in the figures, the manipulator 38 has an internal rotation connection permitting its lower portion to rotate relative to its upper portion. It is alternatively possible for the manipulator 38 to be rotatably connected to the carriage 36 by a suitable connection. It is further alternatively possible for the manipulator 38 to be configured such that the load holding member 56 is not rotatable relative to the carriage 36.

In the embodiments shown in the figures, the load holding member 56 is shown and described as an end effector 140, which is capable of holding the load 58 in a cantilevered manner. However, the load holding member may be a simple chain with a hook that is not capable of holding a load in a cantilevered manner.

In the embodiments shown in the figures, the enclosed member 66 is shown as being enclosed along substantially its entire length and to be enclosed about its entire perimeter. It is not necessary for the enclosed member to be strictly completely enclosed along the entirety of its length. It is possible for the enclosed member to have apertures therethrough at selected points for any suitable purpose, while still remaining an enclosed member in the sense that is intended within this specification.

While the above description constitutes a plurality of embodiments of the present invention, it will be appreciated that the present invention is susceptible to further modification and change without departing from the fair meaning of the accompanying claims.

The invention claimed is:

1. A load maneuvering system, comprising:
    first and second runway rails that extend parallel to a generally horizontal runway axis;
    a bridge including a single bridge rail that extends along a bridge axis that is generally horizontal and perpendicular to the runway axis and that is movable on the runway rails along the runway axis, wherein the bridge includes a plurality of first bridge wheels connected to the bridge rail and supported on the first runway rail, and a plurality of second bridge wheels connected to the bridge rail and supported on the second runway rail,
    a carriage having a plurality of carriage wheels thereon permitting movement of the carriage along the bridge rail; and
    a manipulator configured for holding a load, wherein the manipulator is supported by the carriage and is positionable to cause a first moment to be imposed through the carriage wheels on the bridge rail in a first direction about the bridge axis, wherein the manipulator is positionable to cause a second moment to be imposed through the carriage wheels on the bridge rail in a second direction about the bridge axis that is generally opposite to the first direction about the bridge axis, wherein the manipulator is positionable to cause a third moment to be imposed through the carriage wheels on the bridge rail in a first direction about the runway axis, and wherein the manipulator is positionable to cause a fourth moment to be imposed through the carriage wheels on the bridge rail in a second direction about the runway axis that is generally opposite to the first direction about the runway axis,
    wherein the bridge rail includes
        an enclosed, unitary member that extends along the bridge axis,
        a load weight support surface supported by the enclosed member and oriented to support the weight of the load,
        a first moment support surface supported by a first portion of an exterior surface of the enclosed member and oriented to resist the first moment,
        a second moment support surface supported by a second portion of the exterior surface of the enclosed member that is spaced from the first portion of the exterior surface and oriented to resist the second moment,
        a third moment support surface supported by the exterior surface of the enclosed member and oriented to resist the third moment, and
        a fourth moment support surface supported by the exterior surface of the enclosed member and oriented to resist the fourth moment,
        and wherein the first and second bridge wheels are positioned so as to resist rotation of the bridge rail from the first and second moments.

2. A load maneuvering system as claimed in claim 1, wherein the load weight support surface is an interior surface of the bridge rail.

3. A load maneuvering system as claimed in claim 2, wherein the moment support surfaces are interior surfaces.

4. A load maneuvering system as claimed in claim 1, wherein the bridge rail has a cross-sectional shape that is a hollow rectangle.

5. A load maneuvering system as claimed in claim 2, wherein the bridge rail includes a load weight support member on which is positioned the load weight support surface, wherein the enclosed member is defined by the load weight support member which acts as a first horizontal support member, a second horizontal support member opposed to the load weight support member, a first vertical support member connected between the load weight support member and the second horizontal support member, and a second vertical support member opposed to the first vertical support member and connected between the load weight support member and the second horizontal support member.

6. A load maneuvering system as claimed in claim 5, wherein the enclosed member is a first enclosed member and wherein the second horizontal support member is itself a second enclosed member.

7. A load maneuvering system as claimed in claim 5, wherein the second horizontal support member is a channel beam that is open downwardly.

8. A load maneuvering system as claimed in claim 1, wherein the plurality of carriage wheels includes a first moment support wheel supportable on the first moment support surface and a second moment support wheel supportable on the second moment support surface.

9. A load maneuvering system as claimed in claim 1, wherein the first and second moment support surfaces are the same surface and the plurality of carriage wheels includes a single wheel that is supportable on the said same surface and is positioned to support both the first moment and the second moment.

10. A load maneuvering system as claimed in claim 8, wherein the first moment support wheel is a single wheel supported on a first side of the bridge rail, and wherein the second moment support wheel is a single wheel supported on an opposing second side of the bridge rail directly opposed to the first moment support wheel.

11. A load maneuvering system as claimed in claim 1, wherein the enclosed member is enclosed along substantially the entire length of the bridge rail.

12. A load maneuvering system as claimed in claim 1, wherein the plurality of carriage wheels include a first load weight support wheel rollably supported on the load weight support surface and a second load weight support wheel rollably supported on the load weight support surface and spaced along the bridge axis from the first load weight support wheel, wherein the plurality of carriage wheels further include at least one horizontally oriented wheel supported on the first and second moment support surfaces.

13. A load maneuvering system as claimed in claim 12, wherein the at least one horizontally oriented carriage wheel includes a first horizontal carriage wheel supportable on the first moment support surface and a second horizontal carriage wheel supportable on the second moment support surface.

14. A load maneuvering system as claimed in claim 12, wherein the at least one horizontally oriented carriage wheel includes one horizontally oriented carriage wheel supportable on both the first and second moment support surfaces.

15. A load maneuvering system as claimed in claim 12, wherein the load weight support surface is the third moment support surface and is also the fourth moment support surface.

16. A load maneuvering system as claimed in claim 12, wherein the third and fourth moment support surfaces are made up of the load weight support surface under the load weight support wheels and an opposing surface which is positioned just above the upper edges of the load weight support wheels and wherein the load weight support wheels are also the third and fourth moment support wheels.

17. A load maneuvering system as claimed in claim 1, wherein the plurality of carriage wheels includes a first vertically oriented carriage wheel that is a first load weight support wheel and that is rollably supported on the load weight support surface and a second vertically oriented carriage wheel that is a second load weight support wheel and that is rollably supported on the load weight support surface and spaced along the bridge axis from the first load weight support wheel, wherein the plurality of carriage wheels further includes a third vertically oriented carriage wheel that is vertically spaced from the first and second vertical carriage wheels and wherein the first, second, third and fourth moment support surfaces all comprise a single surface that is configured to engage the upper edge of the third vertical carriage wheel.

18. A load maneuvering system as claimed in claim 1, wherein the manipulator has an end effector configured to hold a load in a cantilevered manner.

19. A load maneuvering system as claimed in claim 1, wherein the second portion of the exterior surface of the enclosed member is generally opposed vertically or horizontally to the first portion of the exterior surface and oriented to resist the second moment.

* * * * *